US011245536B2

(12) United States Patent
Knox

(10) Patent No.: US 11,245,536 B2
(45) Date of Patent: Feb. 8, 2022

(54) SECURE MULTI-PARTY COMPUTATION ATTRIBUTION

(71) Applicant: Facebook, Inc., Menlo Park, CA (US)

(72) Inventor: Andrew Knox, Brooklyn, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 187 days.

(21) Appl. No.: 16/386,103

(22) Filed: Apr. 16, 2019

(65) Prior Publication Data

US 2020/0336313 A1 Oct. 22, 2020

(51) Int. Cl.
*H04L 9/32* (2006.01)
*G06Q 30/02* (2012.01)
*H04L 29/06* (2006.01)

(52) U.S. Cl.
CPC ....... *H04L 9/3247* (2013.01); *G06Q 30/0242* (2013.01); *H04L 9/3228* (2013.01); *H04L 63/10* (2013.01)

(58) Field of Classification Search
CPC ........... G06Q 30/0241; G06Q 30/0242; G06Q 30/0277; G06Q 30/0273; H04L 9/3236; H04L 9/32; H04L 9/085; H04L 9/008; H04L 9/3218; H04L 9/083; H04L 9/0819; H04L 9/3228; H04L 9/3213; H04L 9/3231; H04L 9/3247; H04L 63/126; H04L 63/0428; H04L 63/0281; H04L 63/10; H04L 63/0414; H04L 2209/50; H04L 2209/38; H04L 2209/46; H04L 2209/42;

(Continued)

(56) References Cited

U.S. PATENT DOCUMENTS 9,666,233 B2 * 5/2017 Woods ................. G11B 27/102
10,083,310 B1 * 9/2018 Lampkins ............. G06F 21/606
10,424,034 B1 * 9/2019 Wang ................... G06F 21/6254

(Continued)

OTHER PUBLICATIONS

S. Passmann, A. Lauber-Roensberg and T. Strufe, "Privacy-preserving audience measurement in practice—Opportunities and challenges," 2017 IEEE Conference on Communications and Network Security (CNS), Las Vegas, NV, 2017, pp. 444-449, doi: 10.1109/CNS.2017.8228680.*

(Continued)

*Primary Examiner* — David Garcia Cervetti
(74) *Attorney, Agent, or Firm* — Fenwick & West LLP

(57) ABSTRACT

Secure multi-party computations may be used to get attribution results without compromising user privacy. A content provider and an advertiser may each sign a calculation indicating that they wish to share data using a secure multi-party computation. A measurement company may sign the calculation indicating that the measurement company has evaluated the computation and that the computation will protect user privacy. A user device may confirm with the verification service that all parties have signed the calculation. The user device may transmit one-time identifiers to the measurement company, which allows impression data and conversion data stored by the content provider and the advertiser to be linked. The content provider, the advertiser, and the measurement company may perform the secure multi-party computation, which allows the advertiser to evaluate attribution results without accessing the user data stored by the content provider.

20 Claims, 2 Drawing Sheets

(58) Field of Classification Search
CPC .... H04W 12/02; G06F 21/645; G06F 21/602; G06F 21/64
See application file for complete search history.

(56) References Cited

U.S. PATENT DOCUMENTS

| | | | | |
|---|---|---|---|---|
| 10,467,408 B1* | 11/2019 | Siev | G06F 21/56 | |
| 2006/0218091 A1* | 9/2006 | Choy | G06Q 20/26 | 705/40 |
| 2010/0100724 A1* | 4/2010 | Kaliski, Jr. | H04L 9/3013 | 713/155 |
| 2011/0066499 A1* | 3/2011 | Anatolievich | H04L 67/20 | 705/14.56 |
| 2011/0093347 A1* | 4/2011 | Lindblom | G06Q 30/02 | 705/14.72 |
| 2013/0054366 A1* | 2/2013 | Roundtree | G06Q 30/0241 | 705/14.55 |
| 2014/0089669 A1* | 3/2014 | Papillon | H04W 12/04 | 713/171 |
| 2014/0280995 A1* | 9/2014 | Ezell | H04L 65/103 | 709/229 |
| 2014/0282634 A1* | 9/2014 | Phan | H04N 21/2547 | 725/1 |
| 2014/0282696 A1* | 9/2014 | Mao | G06Q 30/0241 | 725/32 |
| 2014/0289042 A1* | 9/2014 | Merriman | G06Q 30/0251 | 705/14.49 |
| 2014/0344953 A1* | 11/2014 | Roundtree | G06F 21/10 | 726/28 |
| 2015/0095145 A1* | 4/2015 | Shulman | G06Q 30/0241 | 705/14.53 |
| 2015/0271146 A1* | 9/2015 | Holyfield | G06F 21/606 | 713/171 |
| 2015/0302456 A1* | 10/2015 | Rego | G06Q 30/0235 | 705/14.35 |
| 2016/0055322 A1* | 2/2016 | Thomas | H04L 63/0876 | 726/7 |
| 2016/0063539 A1* | 3/2016 | Alla | G06Q 30/0246 | 705/14.45 |
| 2016/0147471 A1* | 5/2016 | O'Hare | G06F 3/067 | 713/171 |
| 2016/0205175 A1* | 7/2016 | Tirk | G06Q 30/0277 | 705/14.41 |
| 2016/0219332 A1* | 7/2016 | Asbun | H04N 21/4532 | |
| 2016/0261409 A1* | 9/2016 | French | H04L 9/00 | |
| 2016/0294550 A1* | 10/2016 | French | H04L 9/3066 | |
| 2016/0351231 A1* | 12/2016 | Woods | G11B 27/28 | |
| 2017/0032413 A1* | 2/2017 | McCartney | H04L 9/14 | |
| 2017/0093817 A1* | 3/2017 | Khoury | H04L 63/105 | |
| 2017/0180797 A1* | 6/2017 | Splaine | H04L 67/20 | |
| 2017/0250816 A1* | 8/2017 | Popa | G06F 21/12 | |
| 2018/0013547 A1* | 1/2018 | Giura | H04L 63/00 | |
| 2018/0108015 A1* | 4/2018 | Rogas | G06F 16/955 | |
| 2019/0205932 A1* | 7/2019 | Ericson | G06Q 30/0255 | |
| 2019/0266631 A1* | 8/2019 | Neuenschwander | H04L 63/0421 | |
| 2019/0287138 A1* | 9/2019 | Buchalter | G06Q 30/0277 | |
| 2019/0333048 A1* | 10/2019 | DiCross | G06Q 20/363 | |
| 2019/0362101 A1* | 11/2019 | Fisse | H04L 63/0421 | |
| 2020/0004973 A1* | 1/2020 | Li | H04L 9/008 | |
| 2020/0084483 A1* | 3/2020 | Brown | H04N 21/23473 | |
| 2020/0160388 A1* | 5/2020 | Sabeg | G06F 21/6245 | |
| 2020/0169410 A1* | 5/2020 | Wainblat | H04L 9/3255 | |

OTHER PUBLICATIONS

L. J. Helsloot, G. Tillem and Z. Erkin, "AHEad: Privacy-preserving online behavioural advertising using homomorphic encryption," 2017 IEEE Workshop on Information Forensics and Security (WIFS), Rennes, 2017, pp. 1-6, doi: 10.1109/WIFS.2017.8267662.*

PCT International Search Report and Written Opinion, PCT Application No. PCT/US2020/027464, dated Jul. 1, 2020, 14 pages.

* cited by examiner

SECURE MULTI-PARTY COMPUTATION ATTRIBUTION

FIELD OF ART

The present disclosure generally relates to the field of computer technology, and more specifically, to attribution for conversions.

BACKGROUND

Computer systems use various software programs and methods to evaluate marketing attribution. Attribution describes how different actions and events contribute to the success of marketing and sales efforts. For example, cookies may be used to track a user's online actions. HTTP cookies (also referred to as a web cookie, Internet cookie, browser cookie, or simply cookie) are small pieces of data sent from a website and stored on the user's computer by the user's web browser while the user is browsing. Cookies allow websites to remember stateful information (such as items added in the shopping cart in an online store) or to record the user's browsing activity (including clicking buttons, logging in, or recording which pages were visited in the past).

The cookies may cause the user's actions to be stored in a log file, and when the user makes a purchase, the log file may indicate what advertisements and content the user previously viewed. However, many users and content publishers concerned with user privacy are hesitant to allow cookies to track an individual's online activity, especially when the tracking is performed by third parties. Additionally, many newer browsers and operating system implement standards that prevent cross-site sharing of user data. It is difficult for existing systems to accurately calculate marketing attribution while maintaining sufficient user privacy.

SUMMARY

Content providers, advertisers, measurement companies, verification services, and browser developers may collaborate to protect user privacy while analyzing distributed data. Secure multi-party computations may be used to get attribution results without compromising user privacy. A content provider and an advertiser may each sign a calculation indicating that they wish to share data using a secure multi-party computation. A measurement company may sign the calculation indicating that the measurement company has evaluated the computation and that the computation will protect user privacy. A user device may confirm with the verification service that all parties have signed the calculation. The user device may transmit one-time identifiers to the measurement company, which allows impression data and conversion data stored by the content provider and the advertiser to be linked. The content provider, the advertiser, and the measurement company may perform the secure multi-party computation, which allows the advertiser to evaluate attribution results without accessing the user data stored by the content provider.

Systems, articles of manufacture, and computer-implemented methods are described herein. The recited components may perform actions including: transmitting a digital signature to a verification service; receiving a request for content from a client device; transmitting the content and an advertisement for an advertiser to the client device; storing a one-time identifier and impression data regarding the advertisement; receiving the one-time identifier from a measurement company; inputting, based on the one-time identifier, the impression data to a secure multi-party computation; and calculating the secure multi-party computation with the measurement company and the advertiser.

In various embodiments, the actions may include using an output of the secure multi-party computation as an input to an attribution model. The content publisher may generate the one-time identifier. The measurement company may verify that the secure multi-party computation is secure. An output of the secure multi-party computation may not contain personally identifiable information. The digital signature may identify the content publisher, the advertiser website, and the measurement company. The client device may transmit the one-time identifier to the measurement company in response to the verification service authorizing a cross-origin resource sharing exception.

In various embodiments, the components may perform actions including: receiving a first digital signature from a content publisher for a secure multi-party computation; receiving a second digital signature from an advertiser for the secure multi-party computation; receiving a third digital signature from a measurement company for the secure multi-party computation; receiving a cross-origin resource sharing verification request from a client device; determining, in response to the receiving the cross-origin resource sharing verification request, that the content publisher, the advertiser server, and the measurement server signed the secure multi-party computation; and transmitting a verification response to the client device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
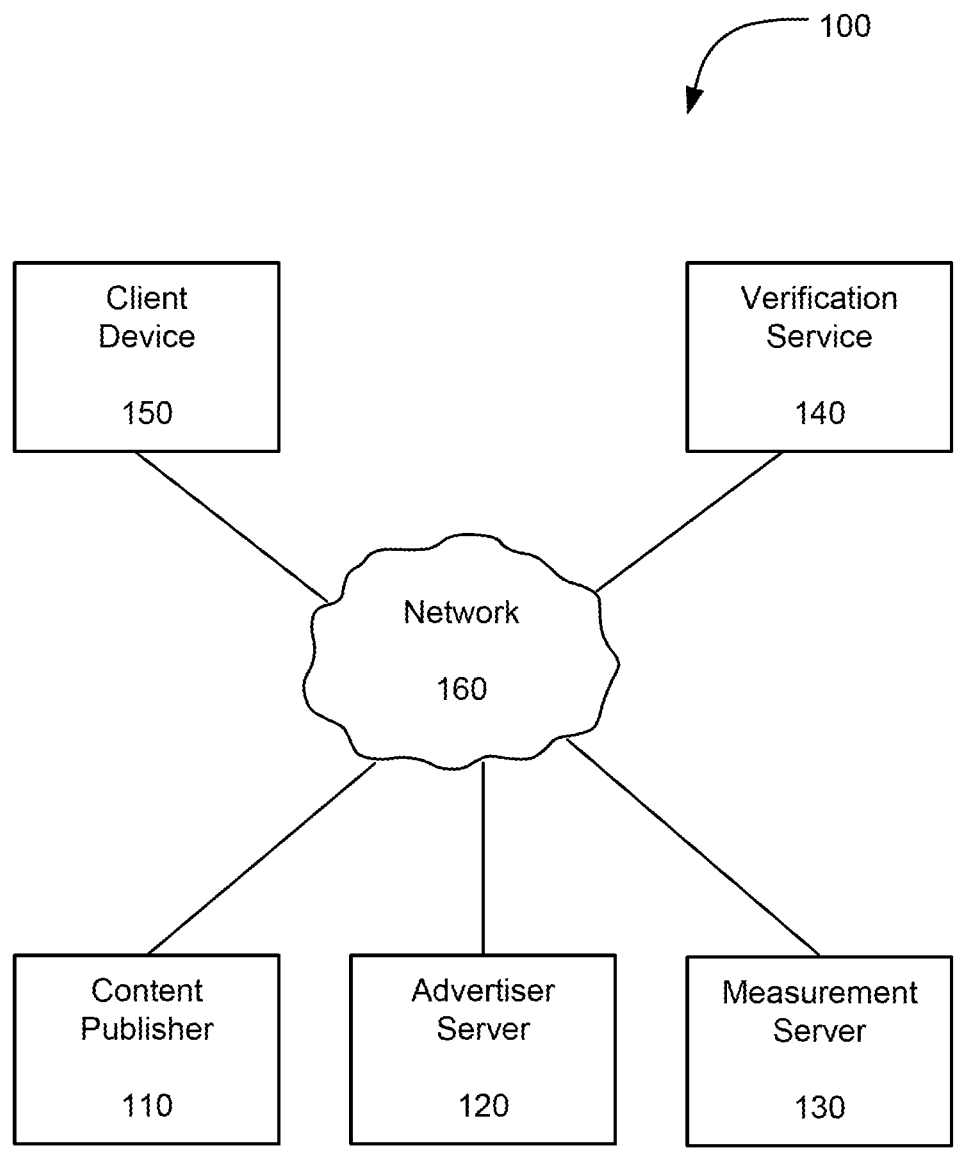
FIG. 1 illustrates a computing environment in secure multi-party computation is used for attribution, according to one embodiment.

FIG. 1 illustrates a detailed view of a system 100 for calculating attribution using secure multi-party computation. The system 100 may comprise a content publisher 110, an advertiser server 120, a measurement server 130, a verification service 140, and a client device 150. These various components are now described in additional detail.

The content publisher 110 may comprise one or more computers, servers, and/or databases configured to generate digital content, such as a website or application, which may be accessed over a network. The content publisher 110 may be configured to transmit advertisements to client devices, such as the client device 150 on behalf of third party advertisers, such as the advertiser server 120. The content publisher 110 may be configured to store a log file of actions performed by the client device 150, such as URLs visited by the client device 150 and advertisements displayed to the client device 150. The content publisher 110 may store demographic information of users which maintain accounts with the content publisher 110.

The advertiser server 120 may comprise one or more computers, servers, and/or databases configured to generate digital content, such as a website or application, which may be accessed over a network. The advertiser server 120 may be operated by an advertiser that sells goods or services. The advertiser may advertise on third-party websites or applications, such as those provided by the content publisher 110. The advertiser server 120 may be configured to store a log file of actions performed by the client device 150, such as URLs visited by the client device 150 and purchases made by the client device 150.

The measurement server 130 may comprise one or more computers, servers, and/or databases configured to determine whether a calculation is secure. The measurement server 130 may be configured to review a proposed multi-party computation and sign the calculation if the proposed multi-party computation is secure. The multi-party computation may be considered secure if the computation results in an anonymous output where personally identifiable information is protected and data is not traceable back to individual users.

The verification service 140 may comprise one or more computers, servers, and/or databases configured to verify that the involved parties have signed a calculation. The verification service 140 may comprise a trusted third party configured to verify the authenticity of signatures to the calculation on behalf of a web browser. The verification service 140 may be configured to authorize a cross-origin resource sharing (CORS) exception. The verification service 140 may act similar to a certificate authority that issues certificates that contain a public key and the identity of the owner of the public key. The verification service 140 may store master public keys for the various entities. Each entity may use a private key to sign content to prove that they created or endorsed the content.

The client device 150 may comprise a computing device such as a smart phone, laptop computer, desktop computer, or any other device that can communicate over a network. A user may utilize the client device 150 to access content. For example, the client device 150 may be used to access a social networking website or application provided by the content publisher 110 or to access a website or application provided by the advertiser server 120. The client device 150 may utilize a browser and/or an operating system and one or more applications.

The various system components may communicate over one or more networks 160. The network 160 may be any suitable communications network for data transmission. In an embodiment such as that illustrated in FIG. 1, the network 160 uses standard communications technologies and/or protocols and can include the Internet. In another embodiment, the entities use custom and/or dedicated data communications technologies.

Figure 2:
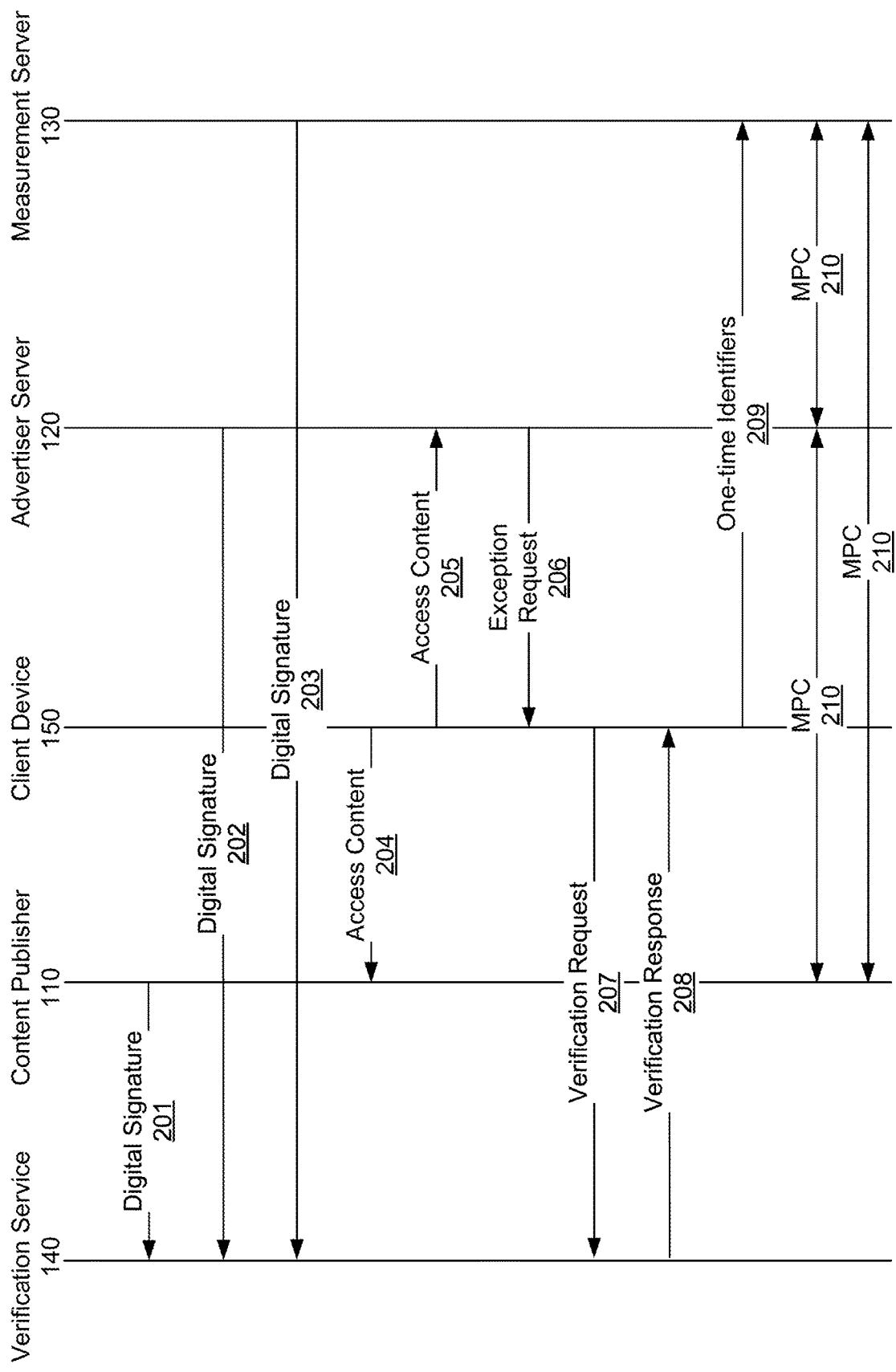
FIG. 2 illustrates the interactions that take place between different entities of FIG. 1 when utilizing secure multi-party computation for attribution, according to one embodiment.

FIG. 2 illustrates the interactions that take place between different entities of FIG. 1 when performing secure multi-party computations according to one embodiment. The advertiser server, the content publisher, and the measurement company may agree to follow a protocol for a secure multi-party computation. The protocol may define what the inputs for each party will be, and how to calculate the output.

The protocol may make use of secret sharing. Secret sharing allows one to distribute a secret among multiple parties by distributing shares to each party. In one embodiment, the protocol may use Shamir secret sharing or additive secret sharing, in which the shares are random elements of a finite field that add up to the secret in the field. The protocol may utilize Beaver triples, which allow additive secret sharing to calculate secure sum. The protocol may comprise the BGW protocol, a virtual party protocol, a secure sum protocol, a Yao-based protocol (also referred to as Garbled Circuit), SPDZ, ABY, SCALE-MAMBA, Oblivious Transfer, Fully Homomorphic Encryption, or any other suitable multi-party computation protocol. The measurement company may evaluate the protocol and determine whether the secure multi-party computation will result in a secure anonymized output that does not share personally identifiable information or otherwise comprise user information.

The content publisher may transmit a digital signature to the verification service (step 201). The digital signature may indicate that the content publisher is willing to share data as part of the secure multi-party computation agreed to by the advertiser server, the content publisher, and the measurement company. The digital signature may identify the advertiser server, the content publisher, and the measurement company as the entities that will be involved in the secure multi-party computation. The digital signature may be applied to a permission, such as a permission indicating that the advertiser, the content publisher, and the measurement company may use the data shared by the content publisher for the secure multi-party computation.

The advertiser server may transmit a digital signature to the verification service (step 202). The digital signature may indicate that the advertiser server is willing to share data as part of the secure multi-party computation agreed to by the advertiser server, the content publisher, and the measurement company. The digital signature may identify the advertiser server, the content publisher, and the measurement company as the entities that will be involved in the secure multi-party computation.

The measurement company may transmit a digital signature to the verification service (step 203). The digital signature may indicate that the measurement company has evaluated the secure multi-party computation and determined that the secure multi-party computation will protect personally identifiable information and any other necessary private user information, such as browsing history. The digital signature may identify the advertiser server, the content publisher, and the measurement company as the entities that will be involved in the secure multi-party computation.

A user may use a client device to access content provided by the content publisher (step 204). For example, the user may visit a website provided by the content publisher using a browser on a client device, the user may open a mobile application provided by the content publisher, or the user may access a skill using a voice personal assistant. In one embodiment, the client device may transmit an HTTP request to the content publisher to access a webpage. In response to the request, the content publisher may transmit the requested content to the client device.

The content publisher may provide one or more advertisements to the user in conjunction with content requested by the user. One or more of the provided advertisements may be an advertisement for the advertiser server. For example, the advertisement may provide an offer for a product sold by the advertiser, and the advertisement may include a link to visit a website provided by the advertiser server.

The content publisher may record actions performed by the user when interacting with the content publisher. For example, the content publisher may place a first-party cookie on the client device, and the content publisher may store the actions performed by the client device in a log file. Each time the user visits a webpage, the browser may transmit information including the URL of the requested webpage and the date/time of the request, and the content publisher may store the information in the log file.

The user may access content provided by the advertiser server (step 205). For example, the user may visit a website provided by the advertiser server using a browser on a client device, the user may open a mobile application provided by the advertiser server, or the user may access a skill using a voice personal assistant. In one embodiment, the client device may transmit an HTTP request to the advertiser server to access a webpage. In one embodiment, the user may access the advertiser content by selecting a link in an advertisement on the webpage provided by the content publisher.

The advertiser server may record actions performed by the user when interacting with the advertiser server. For example, the advertiser server may place a first-party cookie on the client device, and the advertiser server may store the actions performed by the client device in a log file. Each time the user visits a webpage, the browser may transmit information including the URL of the requested webpage and the date/time of the request, and the advertiser server may store the information in the log file.

The advertiser server may transmit a cross-origin resource sharing (CORS) exception request to the user browser (step 206). CORS is a mechanism that allows restricted resources on a web page to be requested from another domain outside the domain from which the first resource was served. The advertiser may wish to know whether the user had viewed any of the advertiser's advertisements displayed by the content publisher. However, CORS rules may prevent the content publisher from sharing that information directly with the advertiser server. The request may indicate which entities will be involved in the secure multi-party computation. For example, the request may identify the advertiser server, the content publisher, the measurement company, and the verification service as entities that will be involved in a secure multi-party computation.

In response to receiving the request for the CORS exception, the browser on the client device may transmit a CORS verification request to the verification service (step 207). The request may include the identities of the entities as provided in the request for the CORS exception received from the advertiser server.

The verification service may evaluate whether each of the entities identified in the CORS verification request has signed a calculation. The verification service may store each signature received from the various entities. Each signature may identify the content publisher, the advertiser server, and the measurement company, and authorize the data provided by the respective entities to be used for the secure multi-party computation. The signatures may be signed by the public key of the respective entity.

The verification service may transmit a verification response to the request for the CORS exception to the client device (step 208). The verification response may indicate which entities signed the calculation. A positive verification response may indicate that the advertiser server, the content publisher, and the measurement server all signed the calculation. A negative verification response may indicate that at least one of the advertiser server, the content publisher, or the measurement company did not sign the calculation. The client device may receive the public keys for the various entities from the verification service, and the client device may use the public keys to verify that the signatures were performed by the respective entities.

In response to receiving a positive verification from the verification service, the client device may transmit one or more one-time identifiers to the measurement company (step 209). The one-time identifiers may allow the measurement company to inform the advertiser server and the content publisher which data should be used for the multi-party computation. In one embodiment, the browser generates a one-time identifier for the content publisher and shares the one-time identifier with the measurement company and the content publisher. Similarly, the browser may generate a one-time identifier for the advertiser server and share the one-time identifier with the measurement company and the advertiser server. In one embodiment, the advertiser server and the content publisher may generate the one-time identifiers and transmit the one-time identifiers to the client device, and the client device may subsequently transmit the one-time identifiers to the measurement company. In one embodiment, the content publisher may generate the one-time identifier for the advertiser server, and the content publisher may hash the one-time identifier using a unique salt per advertiser. Hashing the one-time identifier using the unique salt per advertiser may prevent colluding advertisers from cross-site tracking by comparing identifiers. The measurement company may store the one-time identifier for the advertiser server and the one-time identifier for the content publisher as a linked pair.

The advertiser server, the content publisher, and the measurement company may perform the secure multi-party computation (step 210). Each entity may provide an input. In one embodiment, the measurement company may input the linked pair of one-time identifiers. The one-time identifier for the advertiser server may be transmitted to the advertiser server, and the one-time identifier for the content publisher may be transmitted to the content publisher. However, neither the advertiser server nor the content publisher may have access to the other's one-time identifier.

The measurement company may input multiple linked pairs of one-time identifiers, each linked pair representing a different user. Each one-time identifier for the advertiser server may be transmitted to the advertiser server, and each one-time identifier for the content publisher may be transmitted to the content publisher.

In one embodiment, the advertiser server may input conversion data. Based on the one-time identifiers received by the advertiser server, the advertiser server may select the stored conversion data associated with each received one-time identifier. The conversion data may include a date and time of a website visit by the user, the URLs of the advertiser server webpages visited by the user, and a description of goods or services purchased by the user from the advertiser. In one embodiment, the conversion data may include demographic information about the user, such as age, gender, location, education level, salary, etc. The conversion data may also include the one-time identifier for the advertiser server. In one embodiment, the advertiser server may provide all data stored in the log file for the user. In other embodiments, the advertiser server may provide a subset of the data stored in the log file, such as only a description of goods or services purchased by the user from the advertiser.

In one embodiment, the content publisher may input impression data. Based on the one-time identifiers received by the content publisher, the content publisher may select the stored impression data associated with each received one-time identifier. The impression data may include a date and time of a website visit by the user, the URLs of the content publisher webpages visited by the user, and a description of advertisements presented to the user from the content publisher webpages. In one embodiment, the impression data may include demographic information about the user, such as age, gender, location, education level, salary, etc. The impression data may also include the one-time identifier for the content publisher. In one embodiment, the content publisher may provide all data stored in the log file for the user. In other embodiments, the content publisher may provide a subset of the data stored in the log file, such as only a description of the advertisements presented to the user on behalf of the advertiser.

The advertiser server, the content publisher, and the measurement company may follow the algorithm for the secure multi-party computation as set forth in the previously agreed-upon signed calculation. The advertiser server and/or the content publisher may receive the output of the secure multi-party computation. The output may provide information regarding the effectiveness of advertisements for the advertiser that were provided to the users on a webpage of the content publisher. The output may be provided without revealing any personally identifiable information or browsing history of any particular user.

In one embodiment, the output may provide information regarding a single user. For example, the output may indicate which advertisements for the advertiser the user viewed on a webpage of the content publisher, and the output may further indicate whether the user subsequently made a purchase from the advertiser. In one embodiment, the output does not contain any additional information regarding other content viewed by the user, such as the URL of the content publisher website where the advertisement was displayed.

In one embodiment, the output may provide statistical information regarding the advertisements. For example, the output may indicate a percentage of users which visited the advertiser server webpage after viewing an advertisement for the advertiser on a webpage of the content publisher. The output may indicate a percentage of users which purchased a good or service from the advertiser after viewing an advertisement for the advertiser on a webpage of the content publisher.

In one embodiment, the output may include demographic information. For example, the output may indicate a percentage of users in a specific zip code which visited the advertiser server webpage after viewing an advertisement for the advertiser on a webpage of the content publisher.

In one embodiment, the output may comprise a report. The report may comprise a detailed demographic analysis of the results from the calculation. The report may allow the advertiser server to sort and filter the impressions and conversions based on the demographic information. The advertiser server may utilize the output in calculating attribution models to determine how effective its advertisements had been. Attribution models can be complex and are many are known in the art. However, as a simplified example, the attribution model may calculate that if a user viewed an advertisement presented by the content publisher and subsequently made a purchase from the advertiser, then the purchase was made as a result of the advertisement.

It is appreciated that although the figures and description illustrate and describe interactions according to several embodiments, the precise interactions and/or order of interactions may vary in different embodiments.

The various system components described herein may include at least one processor coupled to a chipset. Also coupled to the chipset are a memory, a storage device, a graphics adapter, and a network adapter. A display is coupled to the graphics adapter. In one embodiment, the functionality of the chipset is provided by a memory controller hub and an I/O controller hub. In another embodiment, the memory is coupled directly to the processor instead of the chipset.

The storage device is any non-transitory computer-readable storage medium, such as a hard drive, compact disk read-only memory (CD-ROM), DVD, or a solid-state memory device. The memory holds instructions and data used by the processor. The graphics adapter displays images and other information on the display. The network adapter couples the computer to a local or wide area network.

As is known in the art, a computer can have different and/or other components than those explicitly described herein. In addition, the computer can lack certain illustrated components. In one embodiment, a computer acting as a server may lack a graphics adapter, and/or display, as well as a keyboard or pointing device. Moreover, the storage device can be local and/or remote from the computer (such as embodied within a storage area network (SAN)).

As is known in the art, the computer is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device, loaded into the memory, and executed by the processor.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to various possible embodiments. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above the description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    transmitting, by a content publisher, a digital signature to a verification service, wherein the digital signature indicates that the content publisher has agreed to a secure multi-party computation protocol to be performed by the content publisher, an advertiser, and a measurement company;
    receiving, by the content publisher, a request for content from a client device;
    transmitting, by the content publisher, the content and an advertisement for an advertiser to the client device;
    storing, by the content publisher, a one-time identifier and impression data regarding the advertisement, wherein the one-time identifier is generated by the content publisher or the client device;
    receiving, by the content publisher, the one-time identifier from a measurement company;
    inputting, by the content publisher and based on receiving the one-time identifier from the measurement company, the impression data to the secure multi-party computation protocol; and
    performing, by the content publisher, the secure multi-party computation protocol, wherein the measurement company inputs a linked pair of one-time identifiers including the one-time identifier to the secure multi-party computation protocol, and wherein the advertiser inputs conversion data to the secure multi-party computation protocol.

2. The computer-implemented method of claim 1, further comprising using an output of the secure multi-party computation as an input to an attribution model.

3. The computer-implemented method of claim 1, further comprising generating, by the content publisher, the one-time identifier.

4. The computer-implemented method of claim 1, wherein the measurement company verifies that the secure multi-party computation is secure.

5. The computer-implemented method of claim 1, wherein an output of the secure multi-party computation does not contain personally identifiable information.

6. The computer-implemented method of claim 1, wherein the digital signature identifies the content publisher, the advertiser, and the measurement company.

7. The computer-implemented method of claim 1, wherein the client device transmits the one-time identifier to the measurement company in response to the verification service authorizing a cross-origin resource sharing exception.

8. A non-transitory computer-readable storage medium comprising instructions executable by a processor, the instructions when executed causing the processor to perform actions comprising:
    transmitting, by the processor, a digital signature to a verification service, wherein the digital signature indicates that a content publisher has agreed to a secure multi-party computation protocol to be performed by the content publisher, an advertiser, and a measurement company;
    receiving, by the processor, a request for content from a client device;
    transmitting, by the processor, the content and an advertisement for an advertiser to the client device;
    storing, by the processor, a one-time identifier and impression data regarding the advertisement, wherein the one-time identifier is generated by the processor or the client device;
    receiving, by the processor, the one-time identifier from a measurement company;

inputting, by the processor and based on receiving the one-time identifier from the measurement company, the impression data to the secure multi-party computation protocol; and performing, by the processor, the secure multi-party computation protocol, wherein the measurement company inputs a linked pair of one-time identifiers including the one-time identifier to the secure multi-party computation protocol, and wherein the advertiser inputs conversion data to the secure multi-party computation protocol.

9. The non-transitory computer-readable storage medium of claim 8, the actions further comprising using an output of the secure multi-party computation as an input to an attribution model.

10. The non-transitory computer-readable storage medium of claim 8, the actions further comprising generating, by the processor, the one-time identifier.

11. The non-transitory computer-readable storage medium of claim 8, wherein the measurement company verifies that the secure multi-party computation is secure.

12. The non-transitory computer-readable storage medium of claim 8, wherein an output of the secure multi-party computation does not contain personally identifiable information.

13. The non-transitory computer-readable storage medium of claim 8, wherein the digital signature identifies the processor, the advertiser, and the measurement company.

14. The non-transitory computer-readable storage medium of claim 8, wherein the client device transmits the one-time identifier to the measurement company in response to the verification service authorizing a cross-origin resource sharing exception.

15. A computer-implemented method comprising:
receiving, by a processor, a first digital signature from a content publisher for a secure multi-party computation, wherein the first digital signature indicates that the content publisher has agreed to a secure multi-party computation protocol to be performed by the content publisher, an advertiser, and a measurement company;

receiving, by the processor, a second digital signature from the advertiser for the secure multi-party computation;

receiving, by the processor, a third digital signature from the measurement company for the secure multi-party computation;

receiving, by the processor, a cross-origin resource sharing verification request from a client device;

determining, by the processor and in response to the receiving the cross-origin resource sharing verification request, that the content publisher, the advertiser, and the measurement company signed the secure multi-party computation protocol; and transmitting, by the processor, a verification response to the client device.

16. The computer-implemented method of claim 15, wherein the second digital signature indicates that the advertiser is willing to share data as part of the secure multi-party computation protocol.

17. The computer-implemented method of claim 15, wherein the verification response indicates that the content publisher, the advertiser, and the measurement company signed the secure multi-party computation protocol.

18. The computer-implemented method of claim 15, wherein the measurement company verifies that the secure multi-party computation protocol is secure.

19. The computer-implemented method of claim 15, wherein an output of the secure multi-party computation protocol does not contain personally identifiable information.

20. The computer-implemented method of claim 15, wherein the first digital signature identifies the content publisher, the advertiser, and the measurement company.

\* \* \* \* \*